UNITED STATES PATENT OFFICE.

EMILE KARL BAOYERLIN, OF LOUISVILLE, KENTUCKY.

ARTIFICIAL FUEL.

SPECIFICATION forming part of Letters Patent No. 426,519, dated April 29, 1890.

Application filed May 6, 1889. Serial No. 309,803. (Specimens.)

*To all whom it may concern:*

Be it known that I, EMILE KARL BAOYERLIN, a citizen of the United States, residing at Louisville, in the county of Jefferson and State of Kentucky, have invented certain new and useful Improvements in Artificial Fuel; and I do hereby declare the following to be a full, clear, and exact description of the invention, such as will enable others skilled in the art to which it appertains to make and use the same.

The object of my invention is the production of a composition of matter that can be used as fuel in stoves having no chimney or outwardly-extending draft-stack.

In carrying out my invention I take a quantity of finely-crushed coal and a quantity of pulverized wood-charcoal, mix them, and impregnate the mass with chemical ingredients, using in the composition the following proportions and quantities: To each one hundred pounds of pulverized coal I take twenty-five pounds of pulverized wood-charcoal, two pounds of carbonate of soda, one pound of saltpeter, six and one-fourth ounces of nitric acid, five ounces of chloride of potash, twelve ounces of black oxide of manganese, eight ounces of permanganate of potash, eight ounces of borax, and eight ounces of magnesia cement, or an equivalent quantity of other suitable binding ingredient, and from twelve to fourteen gallons of water.

My manner of preparing the composition is as follows: I take coal, either bituminous, anthracite, or cannel, crush it and clean it of all sand, slate, and gypsum, and then pulverize it and put it in a kettle of water with five ounces of nitric acid, and boil it to get rid of sulphur and other impurities. I then take wood-charcoal in the proportion stated above, pulverize it, and put it in a kettle and boil it with one and one-fourth ounce of nitric acid to drive out the gases. I then dry each separately and then put them together and mix the mass thoroughly. I next take the carbonate of soda, saltpeter, chloride of potash, black oxide of manganese, permanganate of potash, and the borax, in the proportions stated above, and dissolve them in twelve to fourteen gallons of water. I next pour the carbonaceous mixture into this solution, stir it thoroughly, and then put in the binding ingredients and stir the whole thoroughly again.

I have found by experience that about eight ounces of a preparation known as "magnesia cement" is for the quantity of ingredients previously stated well adapted for a binder, although I do not desire to limit myself to any special substance as a binder for the mass. The mixture is then of the consistency of stiff dough. I then put the doughy mass under a press furnished with molds and press it into small cylindrical rolls, and I then place these rolls in an oven heated to 300° Fahrenheit and dry them thoroughly. I prefer the shape of the rolls, but could press the material into cakes, blocks, or slabs as well.

This composition, when properly prepared, will burn without smoke or the generation of noxious gases to a white ash, and will burn without the aid of any direct current of air or draft, thereby making it especially adapted and useful for heating street-cars, railway-cars, and apartments.

Having thus described my invention, what I claim as new, and desire to secure by Letters Patent, is—

The composition of matter described, consisting of coal, wood-charcoal, carbonate of soda, saltpeter, nitric acid, chloride of potash, black oxide of manganese, permanganate of potash, and borax, retained cohered by a suitable binding material, treated and combined substantially as set forth, and for the purpose specified.

In testimony whereof I affix my signature in presence of two witnesses.

EMILE KARL BAOYERLIN.

Witnesses:
CHARLES ROSENHEIM,
G. FILSENTHAL.